United States Patent [19]
Kidd et al.

[11] Patent Number: 5,427,030
[45] Date of Patent: Jun. 27, 1995

[54] IGNITION GRANULE RETENTION DISC

[75] Inventors: Paul D. Kidd, Plain City; David W. Lindsey, Ogden, both of Utah

[73] Assignee: Morton International, Inc., Chicago, Ill.

[21] Appl. No.: 134,960

[22] Filed: Oct. 12, 1993

[51] Int. Cl.$^6$ .............................................. F42C 19/00
[52] U.S. Cl. .................... 102/202; 102/530; 280/736; 280/741; 422/165
[58] Field of Search ............... 102/202, 380, 530, 531; 280/736, 741; 422/164–166

[56] References Cited

U.S. PATENT DOCUMENTS

| | | | |
|---|---|---|---|
| 3,003,419 | 10/1961 | Fite, Jr. | 102/202 |
| 3,023,702 | 3/1962 | Ratliff, Jr. | 102/202 |
| 3,151,447 | 10/1964 | Bornstein | 102/202 |
| 3,224,373 | 12/1965 | Kramer | 102/202 |
| 3,618,521 | 11/1971 | Montesi | 102/39 |
| 3,715,131 | 2/1973 | Hurley et al. | 280/150 |
| 3,827,715 | 8/1974 | Lynch | 102/530 |
| 3,985,076 | 10/1976 | Schneiter et al. | 102/531 |
| 4,158,696 | 6/1979 | Wilhelm | 280/736 |
| 4,296,084 | 10/1981 | Adams et al. | 423/351 |
| 4,414,902 | 11/1983 | Strasser et al. | 102/531 |
| 4,561,675 | 12/1985 | Adams et al. | 280/734 |
| 4,697,518 | 10/1987 | Lau et al. | 102/530 |
| 4,817,828 | 4/1989 | Goetz | 222/3 |
| 4,878,690 | 11/1989 | Cunningham | 280/741 |
| 4,890,860 | 1/1990 | Schneiter | 280/741 |
| 4,944,528 | 7/1990 | Nilsson et al. | 280/741 |
| 4,998,751 | 3/1991 | Paxton et al. | 280/741 |
| 5,109,772 | 5/1992 | Cunningham et al. | 280/741 |

FOREIGN PATENT DOCUMENTS 3917460  10/1990  Germany .................. 280/736

Primary Examiner—Harold J. Tudor
Attorney, Agent, or Firm—Robert M. Didrick; Gerald K. White

[57] ABSTRACT

An igniter tube for a gas-generating device comprising an elongate cylinder, a primary igniter powder within the cylinder, a closure at one end of the cylinder, and an auto ignition cup disposed at the end of the cylinder opposite the closure is improved by the use of a resin-blocked screen as the closure between the igniter powder and the auto ignition cup.

5 Claims, 2 Drawing Sheets

IGNITION GRANULE RETENTION DISC

BACKGROUND OF THE INVENTION

This invention relates to an apparatus for generating gas for inflating a vehicle occupant restraint in the event of a collision of the vehicle. More specifically, this invention relates to an inflator assembly which generates gas to expand an airbag in the vehicle at the instant of the collision. Still more specifically, this invention relates to such an assembly which comprises an igniter tube filled with a very fine igniter powder and an auto ignition cup in close engagement with the tube.

Many forms of inflators for air bag restraint systems are known. One form utilizes a solid fuel composition for the generation of the inflating gas and includes an annular combustion chamber bounded by inner and outer casings as disclosed in U.S. Pat. Nos. 4,296,084; 4,561,675; and 4,817,828; all of which are incorporated herein by reference. The casings are commonly made of aluminum because of its light weight. Situated in close proximity to the solid fuel, which is usually in granular form, is a primary ignition assembly which comprises an electrical squib, an igniter tube, powdered primary igniter material within the tube, and a metal foil seal at one or both ends of the tube. Upon the occurrence of a collision, the squib fires the primary igniter material whose combustion in turn initiates the burning of the solid, gas-generating fuel. Auto ignition of the primary igniter material may occur, however, in the event that the vehicle is exposed to very high temperatures (e.g., above 650° F.) such as would occur when there is an electrical fire in the engine compartment. To overcome the problem arising from the degradation of the aluminum in the casings at such high temperatures and the potential injury to by-standers by fragments sent flying by a bursting of the weakened casings, an auto ignition cup filled with nitrocellulose or other material which undergoes spontaneous combustion at a much lower temperature (e.g., about 350° F.) is aligned in close engagement with the igniter tube. The strength of the aluminum metal is substantially unaffected at such temperatures. The combustion of the primary igniter material is initiated by the hot gas rushing from the auto ignition cup and burning through the seal at the end of the tube facing the cup.

The practice of installing air bags on the passenger side of vehicles is growing rapidly and may soon become standard procedure. In order to provide a very large surface area for fast ignition, the primary ignition system for the passenger side inflator often uses a very finely powdered igniter material (particles as small as 20 microns) and a wire cloth or screening material is used instead of a metal foil as a seal for the igniter tube. Even when a screen having a 325 mesh size is used, however, some of the fines of the powder escape. Significant loss of powder from an igniter tube may cause a delay or possible malfunction of the ignition system. The screen is held tightly against the end of the igniter tube by a boot made from a thin membrane of an elastomeric material. To shape the boot and impart some structural integrity to it while the assembly is being press fit over the open end of the primary igniter tube, the screen is inserted into the boot before the boot is slipped onto the tube.

A resinous film about 3 mils thick has also been stretched across the central aperture of a toroidal flange to contact the end of a primary igniter tube and thus be interposed between it and an auto-ignition cup to act as a closure for the tube.

SUMMARY OF THE INVENTION

It is an object of this invention, therefore, to provide a rigid but rupturable powder retention disc for the primary ignition tube.

It is a related object of this invention to provide a composite disc for retaining the fine powder within the tube for an extended period of time but which is capable of allowing a flame front from an auto-ignition device to pass into the igniter tube to ignite the primary igniter powder.

It is another related object of this invention to provide an igniter powder retention disc which has structural integrity before installation thereof on the igniter tube.

These and other objects which will become apparent from the appended drawings and the following description are achieved by an improved igniter tube for a gas-generating device, said tube comprising an elongate cylinder, primary igniter powder within said cylinder, a closure at one end of the cylinder, and an auto ignition cup disposed at the end of the cylinder opposite said closure, the improvement comprising a resin-blocked screen disposed as the closure between the igniter powder and the auto ignition cup.

BRIEF DESCRIPTION OF THE DRAWINGS

Having summarized the invention, a detailed description follows with reference to the appended drawings which form part of the specification and of which.

DESCRIPTION OF THE PREFERRED EMBODIMENTS

Figure 1:
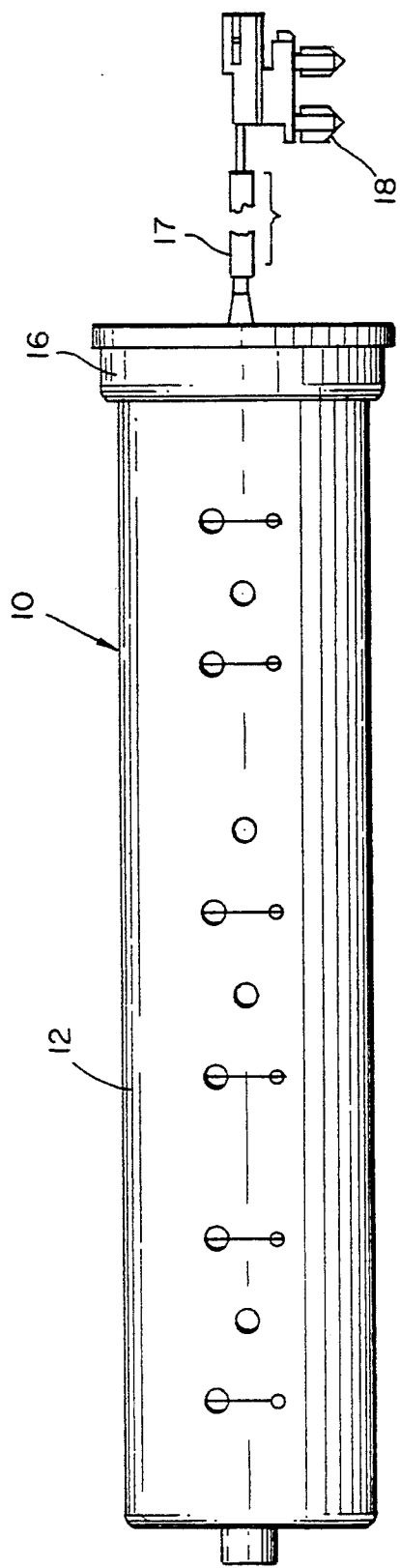
FIG. 1 is a side elevational view of an inflator incorporating the composite igniter powder retention disc of this invention.
Figure 2:
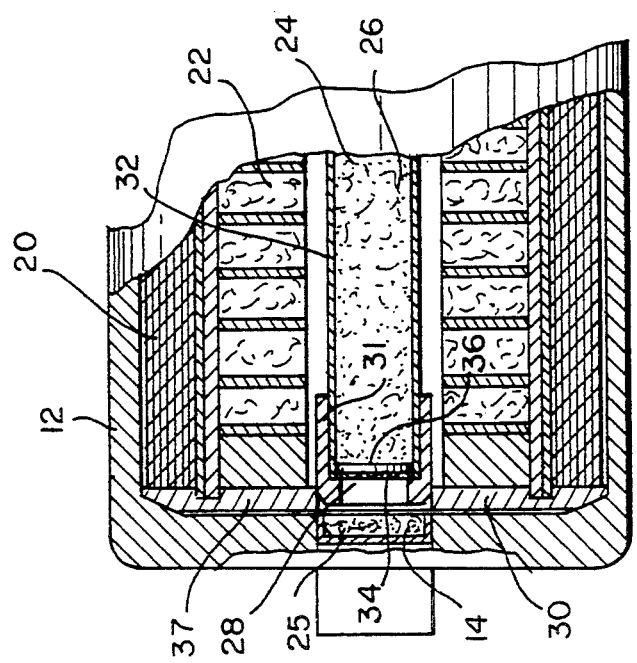
FIG. 2 is a partially broken out sectional view of the left end of the inflator of FIG. 1.
Figure 3:
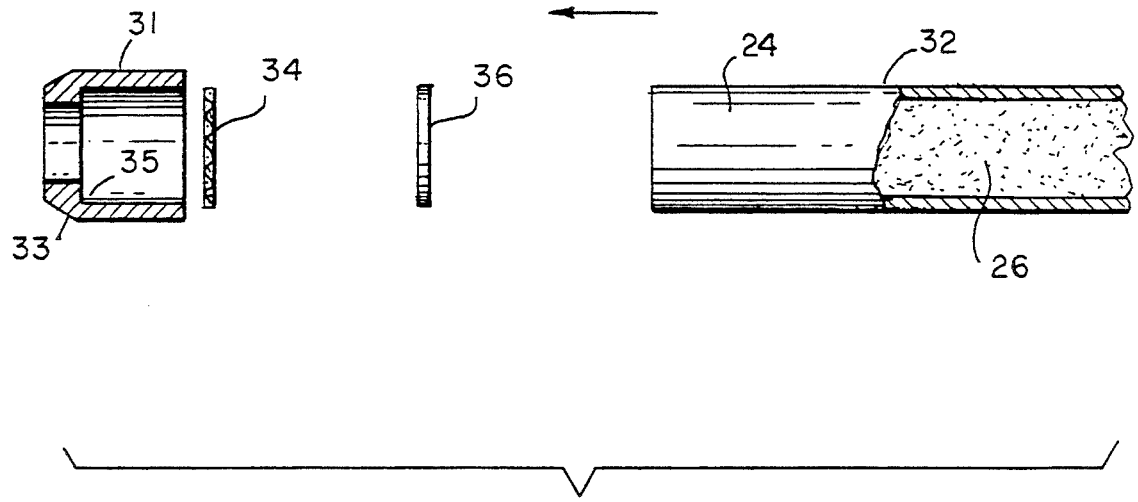
FIG. 3 is an exploded view of one embodiment of the retention disc assembly in relation to the igniter tube.

In FIG. 1, the gas generator or inflator assembly 10 according to the present invention has a generally cylindrical profile and comprises the perforated housing 12 which also functions as a gas diffuser, an auto-ignition cup 14 (shown only in FIG. 2), and the base 16 through which the wires 17 extend from a source of electricity 18. As shown in FIG. 2, the housing 12 surrounds the toroidal filter element 20 which is concentrically disposed about, in turn, the gas generant chamber 22 and the perforated, foil-covered igniter tube 24 which is coaxial with the auto-ignition cup 14. The auto-ignition cup is filled with a nitrocellulose composition such as that sold under the trademark and number IMR 3031 by Dupont or other material which is stable for about ten years or more at temperatures up to 250° F. but will ignite at 350° F. The auto-ignition material is retained within the cup 14 by the screen 25. Finely divided igniter powder 26 is contained within the tube 24, a closure (not shown) at the right end of the tube 24 which may be a retainer for a rapid deflagration cord (also not shown) extending lengthwise within the tube 24, and the composite retention disc 28. The disc 28 is held tightly against the left end of the tube 24 by the openended boot 30 whose skirt 31 grips the outer wall 32 of the tube 24 and whose collar 33 abuts the screen 25 of the auto-ignition cup 14. As shown in FIG. 3, the composite disc 28 comprises the screen 34, which spans the inner diameter of the boot 30 in abutment with the inner surface 35 of the collar 33 and is disposed coaxially within the boot 30 and contributes to its cylindrical shape, and the resinous membrane 36 which is attached to the inner surface of the screen 34 by an adhesive and closes off the openings therein. The wafer-shaped silicone seal 37 has a central aperture through which the boot 30 and the cup 14 extend toward one another.

Figure 4:
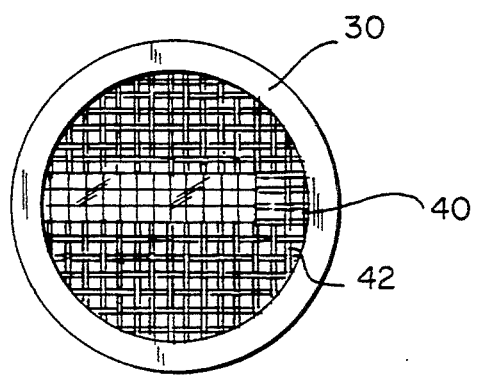
FIG. 4 is a partially broken out end elevational view of another embodiment of the retention disc assembly.

A second embodiment of the invention is shown in FIG. 4, wherein for purposes of illustration only a portion of the screen 40 is shown to be impregnated with the resin 42 instead of being contiguous with a membrane.

The screen 34 is metallic and may have a mesh size of from about 50 to about 325 but a 100 mesh screen is preferred for its rigidity and strength. As was said above the particle size of the primary igniter powder may be as small as about 20 microns but it is usually on the order of about 40 microns because the improved igniter tube of this invention is primarily intended for use in passenger side inflators wherein the high peak pressures experienced in driver side inflators are not a problem. Although the composition and properties of the primary igniter powder do not form a part of this invention, a preferred material is one commonly referred to as boron potassium nitrate or $BKNO_3$ which burns to produce on the order of about 1500 calories per gram of material.

Likewise, the nature of the auto-ignition composition does not form a part of this invention but a 1:2 by weight mixture of the primary igniter material and the auto-ignition material IMR 3031 is suitable.

The membrane 36 and the impregnant 42 may be made of a resin which will not weaken significantly due to softening at temperatures which the vehicle may experience in normal usage and storage but will instantaneously burn away from the screen 34 or the screen 40 in the flame front produced by the burning of the auto-ignition material. Examples of the resins suitable for the purposes of this invention include polyesters, polyacrylates, polyethylene, polypropylene, and polyurethane. A MYLAR polyester film is preferable for use as the membrane 36 and a polyurethane resin is preferred as the impregnant for the screen 40. In both cases, it is critical to the successful operation of this invention that the membrane or impregnant be as thin as possible to allow it to vanish instantaneously in the event of a collision. The resin layer cannot be too sturdy to start with because its physical resistance to the passage of the flame front is coupled with that of the fine mesh screen. This is especially so when a screen having a linen weave such as the single plain Dutch weave or the HIFLO filter weave is used. It has been found that the resin layer must be no thicker than about 10 mils and preferably from about 2 to no more than about 6 mils. Suitably, the thickness of the resin corresponds to the diameter of the wires making up the screen.

The subject matter claimed is:

1. In an igniter tube for an air bag inflator, said tube comprising an elongate cylinder, primary igniter powder within said cylinder, a closure at one end of the cylinder, and an auto ignition cup disposed at the end of the cylinder opposite said closure, the improvement comprising a rupturable composite disc of a resin-blocked screen held against said opposite end of the cylinder between the igniter powder and the auto ignition cup, said resin being from about 2 to about 10 mils thick and said screen has a mesh size of from about 50 to about 325.

2. The improved tube of claim 1 wherein the resin of the resin-blocked screen is no thicker than about 6 mils.

3. The improved tube of claim 1 wherein the resin of the resin-blocked screen is a polyester film adhered to the screen.

4. The improved tube of claim 1 wherein the resin of the resin-blocked screen is polyurethane.

5. The improved tube of claim 4 wherein the screen is impregnated with polyurethane.

* * * * *